May 16, 1961     D. HOLLEY     2,984,346
CAPSULE PACKAGING
Filed Aug. 25, 1958

INVENTOR.
DANFORTH HOLLEY
ATTORNEYS

United States Patent Office 2,984,346
Patented May 16, 1961

2,984,346

CAPSULE PACKAGING

Danforth Holley, Grosse Pointe Farms, Mich., assignor to Holley Plastics Company, Van Dyke, Mich., a corporation of Michigan Filed Aug. 25, 1958, Ser. No. 757,044

5 Claims. (Cl. 206—65)

This invention relates to multi-capsule plastic packages and refers more particularly to a multi-capsule plastic package including means integral therewith to facilitate the removal of individual capsules from the package and also including means to aid entry into the individual capsules, the multi-capsule packages being so formed as to nest within each other in back-to-back relationship for economy in storage.

Multi-capsule plastic packaging has many advantages over other types of packaging. Plastic is lightweight, approximately 30% lighter in weight than fiber can packaging. Plastic may be transparent providing for ready recognition of packaged articles during inventory and also providing customer eye appeal. Plastic packages may be conveniently sealed to prevent moisture and dust from entering the package and corroding or contaminating the packaged articles. The inclusion of a number of individual capsules each containing an article to be packaged in a single multi-capsule package also has the advantages of providing packages which are of convenient size to handle and allowing the packages to be nested together for convenience in shipping and economy of storage space.

However it is often desirable to use the articles packaged in the individual capsules of multi-capsule packages at separate times. This necessitates the removal of the capsules individually from the package. Because it is desirable to have the plastic of which the package is made relatively strong for protection of the packaged article, it is desirable to provide means included in the package to facilitate the separation of individual capsules from the package. In the past, provisions made to facilitate the removal of the individual capsules from the larger package have been generally unsatisfactory. Perforations in a line separating the individual capsules are unsatisfactory in plastic packages as most plastic provides no structural planes to guide a tear line between individual perforations. Also perforated lines and other separating means wherein part of the connecting sections between capsules have been cut away often allow undesirable accidental detachment of individual capsules from the multi-capsule package.

Also, because the individual plastic capsules must be relatively strong to prevent accidental damage thereto it is desirable to provide means to facilitate entry into the individual capsules when it is desired to use the article packaged therein. Such means should not destroy the sealed state of the individual capsules.

Therefore it is one of the essential objects of my invention to provide improved means to separate individual capsules from multi-capsule plastic packages.

Another object is to provide improved means to remove a packaged article from a plastic capsule.

Another object is to insert a plastic seal line between capsules of a multi-capsule plastic package thereby providing a tear line of weakened plastic material.

Another object is to provide a tear line of plastic material weaker than the surrounding material across individual capsules to facilitate entry into the capsules.

Another object is to provide multi-capsule plastic packages which may be nested together in back-to-back relationship for economy in storage and convenience in transportation.

Another object is to provide a multi-capsule plastic package which is simple, economical to manufacture, and efficient in use.

Other objects and features of the invention will become apparent as the description proceeds, especially when taken in conjunction with the accompanying drawings, illustrating preferred embodiments of the invention, wherein.

Figure 1:
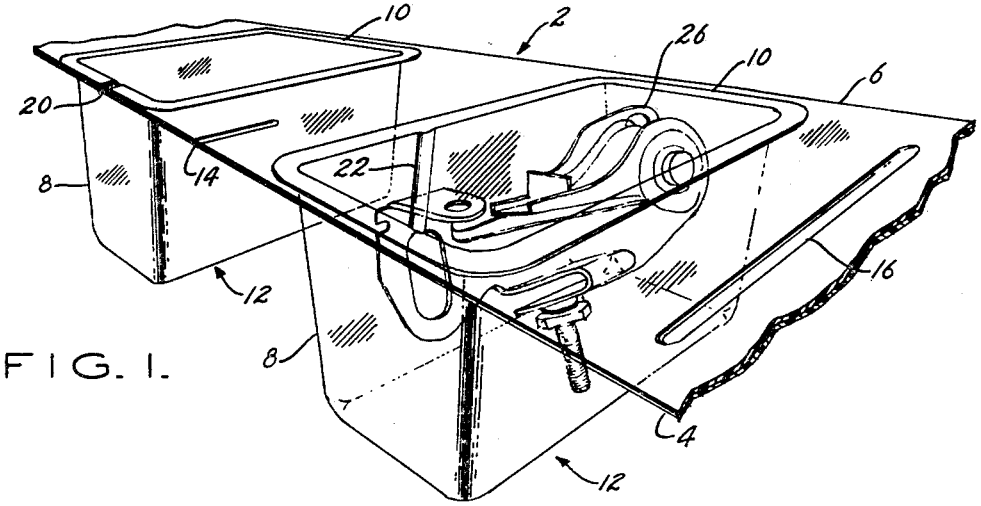
Figure 1 is a perspective view of a part of a multi-capsule plastic package illustrating tear lines between individual package capsules and on individual capsules according to this invention.

According to the present invention a multi-capsule plastic package generally designated 2 in the figures is provided. The plastic package 2 includes a bottom member 4 and a top sheet 6. The bottom member 4 is provided with pockets 8 spaced along the length thereof. Top sheet 6 is heat sealed to bottom member 4 around the periphery of pockets 8 as indicated at 10 whereby individual capsules generally designated 12 are produced. Between individual capsules 12 top sheet 6 and bottom member 4 are heat sealed together as indicated at 14 and 16 to provide tear lines. A tear line is also provided on each individual capsule as indicated at 20 and 22.

Figure 2:
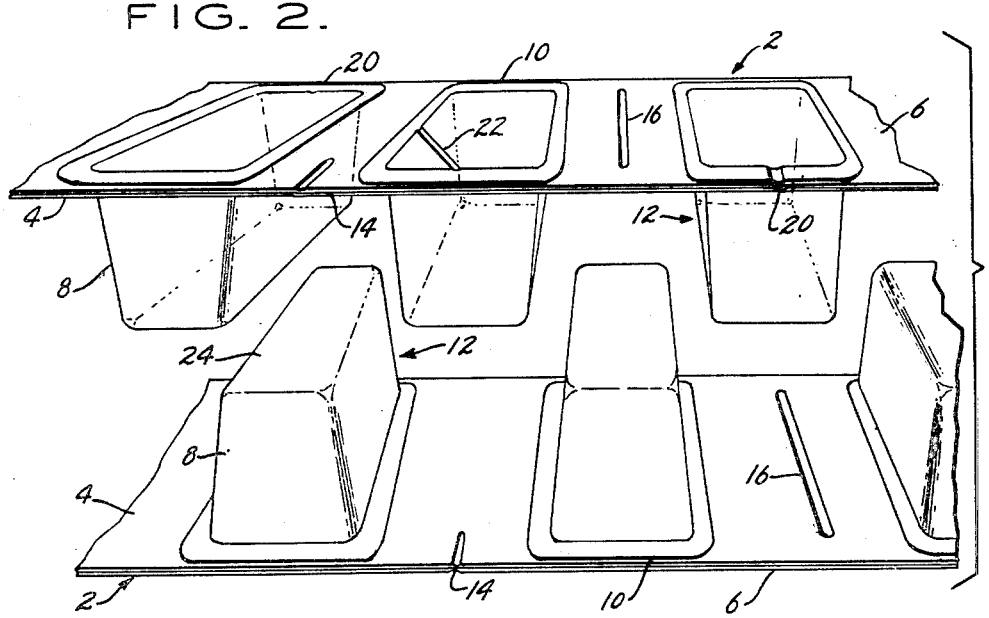
Figure 2 is a perspective of part of two multi-capsule plastic packages illustrating the interlocking of the individual capsules when the plastic packages are nested back-to-back according to this invention.

Bottom member 4 in the embodiment of the invention indicated in the figures is an elongated rectangular member having a plurality of rectangular pockets 8 spaced along the length thereof. Pockets 8 are spaced along member 4 so that the distance between the pockets is approximately equal to the average width of the pockets to facilitate the nesting of packages 2 when placed in back-to-back relationship as indicated in Figure 2. To further aid the nesting of packages 2 the opposite sides of pockets 8 converge slightly toward the bottoms 24 of the pockets. A single bottom member 4 may contain any number of pockets 8 depending on the number of capsules 12 desired in the completed package 2.

Top sheet 6 is a substantially flat member of the same width and length as member 4. Top 6 when placed over bottom 4 forms a cover for individual capsules 12 and strengthens package 2 tending to prevent accidental detachment of individual capsules 12 therefrom.

Both top sheet 6 and bottom member 4 may be made of plastics such as cellulose acetate, cellulose acetate butyrate or polyethylene compounds. The material used should generally be transparent and be capable of being heat sealed with dielectric heaters.

In manufacture bottom member 4 which may be produced from the materials indicated above in any known manner not a part of this invention is placed in a bottom mold having substantially the same configuration as member 4. The bottom mold forms a lower electrode for a heat sealing device. An article to be packaged indicated at 26 in Figure 1 is placed in each pocket 8 of member 4. Top sheet 6 is then placed over member 4 and is heat sealed thereto around the periphery of pockets 8 as indicated at 10. This heat sealing is accomplished with the aid of a dielectric heater head in conjunction with the aforesaid bottom mold. The sealing operation produces a complete multi-capsule package according to the invention including a number of connected individual plastic capsules 12.

According to the present invention at the same time as the seal at 10 is produced other electrode members may produce seal lines 14, 16, 20 or 22 on package 2. Seal lines 14, 16, 20 and 22 are representative of possible embodiments of the tear line feature of the package of the present invention. Lines 14 and 16 are intended for alternative use as are lines 20 and 22. Lines 14, 16, 20 and 22 are solid lines of plastic material which have been in contact with heat sealing electrodes so that these lines are weaker than the surrounding material.

Lines 14 and 16 are provided on package 2 to facilitate the detachment therefrom of a single capsule 12. Line 14 is particularly suited to the initiation of a crosswise tear in package 2 due to its extension to the extreme edge of the package. Line 16 provides a tear line across practically the entire width of package 2 with a small area of strong plastic material left at the extreme edge on both sides of package 2 which tends to keep capsules 12 from being accidentally detached from package 2. Lines 14 and 16 allow individual capsule units 12 to be detached from package 2 with efficiency and ease even though a very strong material is used for member 4 and sheet 6.

Lines 20 and 22 are provided on individual capsules 12 of package 2 to facilitate the removal from capsule 12 of articles such as 26 packaged therein. Line 20 across the seal indicated at 10 permits the easy starting of a tear leading to the destruction of the entire capsule 12. Line 22 permits the top of the capsule 12 to be pierced easily with the finger or thumb. Either of lines 20 or 22 permit ready access to the article 26 without the use of cutting tools.

In storage or transportation packages 2 may be nested as indicated in Figure 2 to provide neat piles on shelves which are economical of storage space. This nesting feature of package 2 allows storage of the parts 26 in capsules 12 on open shelves without the need of bins or boxes usually needed to confine small parts to specific areas.

The drawings and the foregoing specification constitute a description of the improved capsule packaging in such full, clear, concise and exact terms as to enable any person skilled in the art to practice the invention, the scope of which is indicated by the appended claims.

What I claim as my invention is:

1. A multi-capsule plastic package comprising an elongated rectangular, form sustaining, sealable plastic, bottom member having a plurality of open pockets therein which are spaced along the length thereof and which are adapted to individually receive articles to be packaged, a substantially flat rectangular, form sustaining, sealable plastic, top member adapted to cover said bottom member and said open pockets therein, said top member being sealed to said bottom member around the periphery of each of said pockets forming a flange therearound whereby a plurality of individual sealed capsules connected together in a single package are produced, a tear line consisting of a deep plastic seal line in a single thickness of material providing a solid line of material weaker than the surrounding material extending across the top of each of said capsules between opposite points on said flange surrounding each of said capsules to facilitate entry into said sealed capsules, adjacent pockets forming the individual sealed capsules including adjacent substantially parallel sides extending substantially perpendicularly with respect to said top member and transversely of said multi-capsule plastic package, the individual capsules of said multi-capsule plastic packages being of a dimension longitudinally of said multi-capsule plastic package equal to the longitudinal spacing thereof whereby a pair of multi-capsule plastic packages may be nested with the sides of the individual capsules in surface to surface contact to provide a rigid rectangular unit to facilitate storing and shipping of said multi-capsule plastic package, and tear lines consisting of deep plastic seals between said bottom and top members extending crosswise of said package between adjacent capsules, the last mentioned deep plastic seals being rigid but substantially weaker than the surrounding material to facilitate the detachment of individual capsules from the multi-capsule package while maintaining the rigidity of the multi-capsule package.

2. A multi-capsule plastic package comprising an elongated rectangular, form sustaining, sealable plastic, bottom member having a plurality of open pockets therein which are spaced along the length thereof and which are adapted to individually receive articles to be packaged, a substantially flat rectangular, form sustaining, sealable plastic, top member adapted to cover said bottom member and said open pockets therein, said top member being sealed to said bottom member around the periphery of each of said pockets forming a flange therearound whereby a plurality of individual sealed capsules connected together in a single package are produced, adjacent pockets forming the individual sealed capsules including adjacent substantially parallel sides extending substantially perpendicularly with respect to said top member and transversely of said multi-capsule plastic package, the individual capsules of said multi-capsule plastic packages being of a dimension longitudinally of said multi-capsule plastic package equal to the longitudinal spacing thereof whereby a pair of said multi-capsule plastic packages may be nested with the sides of the individual capsules in surface to surface contact to provide a rigid rectangular unit to facilitate storing and shipping of said multi-capsule plastic package, and tear lines consisting of deep plastic seals between said bottom and top members extending crosswise of said package between adjacent capsules, the last mentioned deep plastic seals being rigid but substantially weaker than the surrounding material to facilitate the detachment of individual capsules from the multi-capsule package while maintaining the rigidity of the multi-capsule package.

3. A multi-capsule plastic package comprising an elongated rectangular, form sustaining, sealable plastic, bottom member having a plurality of open pockets therein which are spaced along the length thereof and which are adapted to individually receive articles to be packaged, a substantially flat rectangular, form sustaining, sealable top member adapted to cover said bottom member and said open pockets therein, said top member being sealed to said bottom member around the periphery of each of said pockets forming a flange therearound whereby a plurality of individual sealed capsules connected together in a single package are produced, the pockets forming the individual sealed capsules including opposite sides tapering toward each other outward of said top member and extending transversely of said multi-capsule plastic package, the individual capsules of said multi-capsule plastic packages being of a dimension longitudinally of said multi-capsule plastic package equal to the longitudinal spacing thereof whereby a pair of said multi-capsule plastic packages may be nested with the sides of the individual capsules in surface to surface contact to provide a rigid rectangular unit of substantially the same thickness as an unnested multi-capsule plastic package to facilitate storing and shipping of said multi-capsule plastic package.

4. A multi-capsule plastic package comprising an elongated rectangular, form sustaining, sealable plastic bottom member having a plurality of open pockets therein which are spaced along the length thereof and which are adapted to individually receive articles to be packaged, a substantially flat rectangular, form sustaining, sealable top member adapted to cover said bottom member and said open pockets therein, said top member being sealed to said bottom member around the perihpery of each of said pockets forming a flange therearound whereby a plurality of individual sealed capsules connected together in a single package are produced, a mechanically weak tear line extending partly across the individual sealed capsules to facilitate entry into said individual capsules, the pockets forming the individual sealed capsules including opposite sides tapering toward each other outward of said top member and extending transversely of said multi-capsule plastic package, the individual capsules of said multi-capsule plastic packages being of an average dimension longitudinally of said multi-capsule plastic package substantially equal to the longitudinal spacing thereof whereby a pair of said multi-capsule plastic packages may be nested with the sides of the individual capsules in surface-to-surface contact to provide a rigid rectangular unit of substantially the same thickness as an unnested multi-capsule plastic package to facilitate storing and shipping of said multi-capsule plastic package.

5. A multi-capsule plastic package comprising an elongated rectangular, form sustaining, sealable plastic bottom member having a plurality of open pockets therein which are spaced along the length thereof and which are adapted to individually receive articles to be packaged, a substantially flat rectangular, form sustaining, sealable top member adapted to cover said bottom member and said open pockets therein, said top member being sealed to said bottom member around the periphery of each of said pockets forming a flange therearound whereby a plurality of individual sealed capsules connected together in a single package are produced, the pockets forming the individual sealed capsules including opposite sides tapering toward each other outward of said top member and extending transversely of said multi-capsule plastic package, the individual capsules of said multi-capsule plastic packages being of an average dimension longitudinally of said multi-capsule plastic package at least equal to the longitudinal spacing thereof whereby a pair of said multi-capsule plastic packages may be nested with the sides of the individual capsules in surface-to-surface contact to provide a rigid rectangular unit of substantially the same thickness as an unnested multi-capsule plastic package to facilitate storing and shipping of said multi-capsule plastic package, and mechanically weak tear lines extending crosswise of said package between adjacent capsules to facilitate the detachment of individual capsules from the multi-capsule package.

References Cited in the file of this patent

UNITED STATES PATENTS

| | | |
|---|---|---|
| 1,544,389 | Hall | June 30, 1925 |
| 2,138,241 | Koch et al. | Nov. 29, 1938 |
| 2,185,604 | Moore | Jan. 2, 1940 |
| 2,487,123 | Fluss et al. | Nov. 8, 1949 |
| 2,705,579 | Mason | Apr. 5, 1955 |
| 2,736,656 | Marshall | Feb. 28, 1956 |
| 2,779,462 | Hoag | Jan. 29, 1957 |
| 2,893,550 | Sandmeyer | July 7, 1959 |
| 2,908,383 | Vogt | Oct. 13, 1959 |

FOREIGN PATENTS

| | | |
|---|---|---|
| 447,712 | Great Britain | May 25, 1936 |
| 577,150 | Great Britain | May 7, 1946 |
| 1,010,631 | France | June 13, 1952 |
| 1,152,024 | France | Aug. 26, 1957 |